United States Patent
Bhardwaj

(10) Patent No.: US 9,285,516 B2
(45) Date of Patent: Mar. 15, 2016

(54) ACTUATOR MOTION CONTROL MECHANISM FOR A CONCAVE MIRROR

(76) Inventor: Avinash Girish Bhardwaj, Ellington, CT (US)

( * ) Notice: Subject to any disclaimer, the term of this patent is extended or adjusted under 35 U.S.C. 154(b) by 366 days.

(21) Appl. No.: 12/848,288

(22) Filed: Aug. 2, 2010

(65) Prior Publication Data

US 2012/0026614 A1     Feb. 2, 2012

(51) Int. Cl.
  *G02B 5/08*     (2006.01)
  *G02B 5/10*     (2006.01)

(52) U.S. Cl.
  CPC .......................................... *G02B 5/10* (2013.01)

(58) Field of Classification Search
  USPC ................... 359/223.1–226.1, 846, 871, 872
  See application file for complete search history.

(56) References Cited

U.S. PATENT DOCUMENTS

| | | |
|---|---|---|
| 5,064,619 A | 11/1991 | Finlan |
| 5,724,200 A | 3/1998 | Mochizuki |
| 6,590,697 B2 | 7/2003 | Vaganov |
| 6,672,744 B2 | 1/2004 | DeLine |
| 6,768,756 B2 | 7/2004 | Flanders |
| 6,778,315 B2 | 8/2004 | Guo |
| 7,385,768 B2 | 6/2008 | Wo |
| 7,397,593 B2 * | 7/2008 | Murakami et al. ......... 359/224.1 |
| 7,473,878 B2 | 1/2009 | Schrader |
| 7,679,267 B2 | 3/2010 | Heim |
| 2003/0090776 A1 | 5/2003 | Vaganov |
| 2006/0151449 A1 | 7/2006 | Warner, Jr. |
| 2008/0117289 A1 | 5/2008 | Schowengerdt |

* cited by examiner

*Primary Examiner* — Euncha Cherry

(57) ABSTRACT

A method for varying a radius of curvature of a concave mirror includes coupling a concave mirror to a mirror frame, coupling the mirror frame to a vertical slide, coupling the vertical slide to a horizontal slide, coupling the horizontal slide to a fixed support, coupling an end of the mirror frame to an actuator, coupling a first proximity sensor to the mirror frame, coupling a second proximity sensor to the horizontal slide, and coupling a third proximity sensor to the vertical slide. The method also includes translating the mirror frame along the vertical slide and translating the vertical slide along the horizontal slide to facilitate aligning a pole of the concave mirror with a center of an object, and varying the radius of curvature of the concave mirror to magnify an image of an object in the concave mirror for optimum clarity.

18 Claims, 3 Drawing Sheets

ACTUATOR MOTION CONTROL MECHANISM FOR A CONCAVE MIRROR

FIELD OF THE INVENTION

This invention relates generally to a concave mirror assembly, and more particularly to methods and apparatus for varying a spatial orientation of a concave mirror as a function of a position of a center of an object from a pole of the concave mirror.

BACKGROUND OF THE INVENTION

Most consumers employ concave mirrors to observe their bodily reflections as they perform their daily activities such as shaving, applying make-up, tweezing, Etc. Traditional concave mirrors are statically positioned in bathrooms/make-up counter facilities for enabling a user to observe her bodily reflection. In order for a user to observe her bodily reflection at the appropriate level of magnification and clarity, the user has to negotiate a back and forth displacement from a reflective surface of the concave mirror. Consequently, the user may be unable to maintain a stable spatial orientation before the reflective surface of the concave mirror while performing her activities thereby leading to a continuous distortion in the image quality. Moreover, the user may have to position herself at a fixed axial displacement from the reflective surface of the concave mirror on every occasion that the mirror is utilized. Therefore, the user may be unable to seat herself comfortably at preferred axial displacements from the reflective surface of the concave mirror for performing her activities without distorting the image quality. Consequently, there exists a need for a concave mirror of varying radius of curvature that would enable a user to observe her magnified bodily image at optimum clarity at different spatial orientations from the reflective surface of the concave mirror.

The need has existed for many years, yet there is no fully satisfactory system to meet the need. In accord with a long recognized need, there has been developed a concave mirror assembly to satisfy many users' cosmetic needs. The device itself is compact and easily interchangeable with mirrors of different radii of curvature. It is a versatile device in that its position and radius of curvature may be varied to enable a user to observe her magnified bodily image at optimum clarity at different spatial orientations from the reflective surface of the concave mirror.

BRIEF DESCRIPTION OF THE INVENTION

In one aspect, a method is provided for positioning a mirror frame of a concave mirror assembly as a function of a position of a center of an object, and varying a radius of curvature of a concave mirror to magnify an image of the object in the concave mirror for optimum clarity. The method comprises coupling a first portion of the mirror frame to a second portion of the mirror frame, coupling the second portion of the mirror frame to a vertical slide, coupling the vertical slide to a horizontal slide, coupling the horizontal slide to a fixed support, coupling an end of the first portion of the mirror frame to an actuator, coupling the concave mirror to the first portion of the mirror frame, coupling a first proximity sensor to the first portion of the mirror frame, coupling a second proximity sensor to the horizontal slide, and coupling a third proximity sensor to the vertical slide. The method also includes translating the mirror frame along the vertical slide and translating the vertical slide along the horizontal slide to facilitate aligning a pole of the concave mirror with a center of the object, and varying the radius of curvature of the concave mirror to magnify an image of the object in the concave mirror for optimum clarity.

In another aspect of the invent*, a concave frame and mirror assembly for varying a radius of curvature of a concave mirror is provided. The concave frame and mirror assembly includes a mirror frame, an end of which is coupled to an actuator for varying its circumferential length. The mirror frame is configured to be coupled to a concave mirror and is configured to vary a radius of curvature of the concave mirror to magnify an image of an object in the concave mirror for optimum clarity.

In a further aspect, a concave mirror assembly for varying a spatial orientation of a concave mirror is provided. The concave mirror assembly includes a first portion of a mirror frame detachably coupled to a second portion of the mirror frame. The first portion of the mirror frame is coupled to a vertical slide, and a horizontal slide coupled to the vertical slide. An end of the second portion of the mirror frame is coupled to an actuator for varying its circumferential length. The second portion of the mirror frame is configured to be coupled to the concave mirror. The concave mirror assembly includes a control system configured to control a displacement of the first portion of the mirror frame along the vertical slide, and control a displacement of the vertical slide along the horizontal slide to facilitate aligning a pole of the concave mirror with a center of an object, and to facilitate varying a radius of curvature of the concave mirror to magnify an image of the object in the concave mirror for optimum clarity.

DETAILED DESCRIPTION OF THE INVENTION

Figure 1:
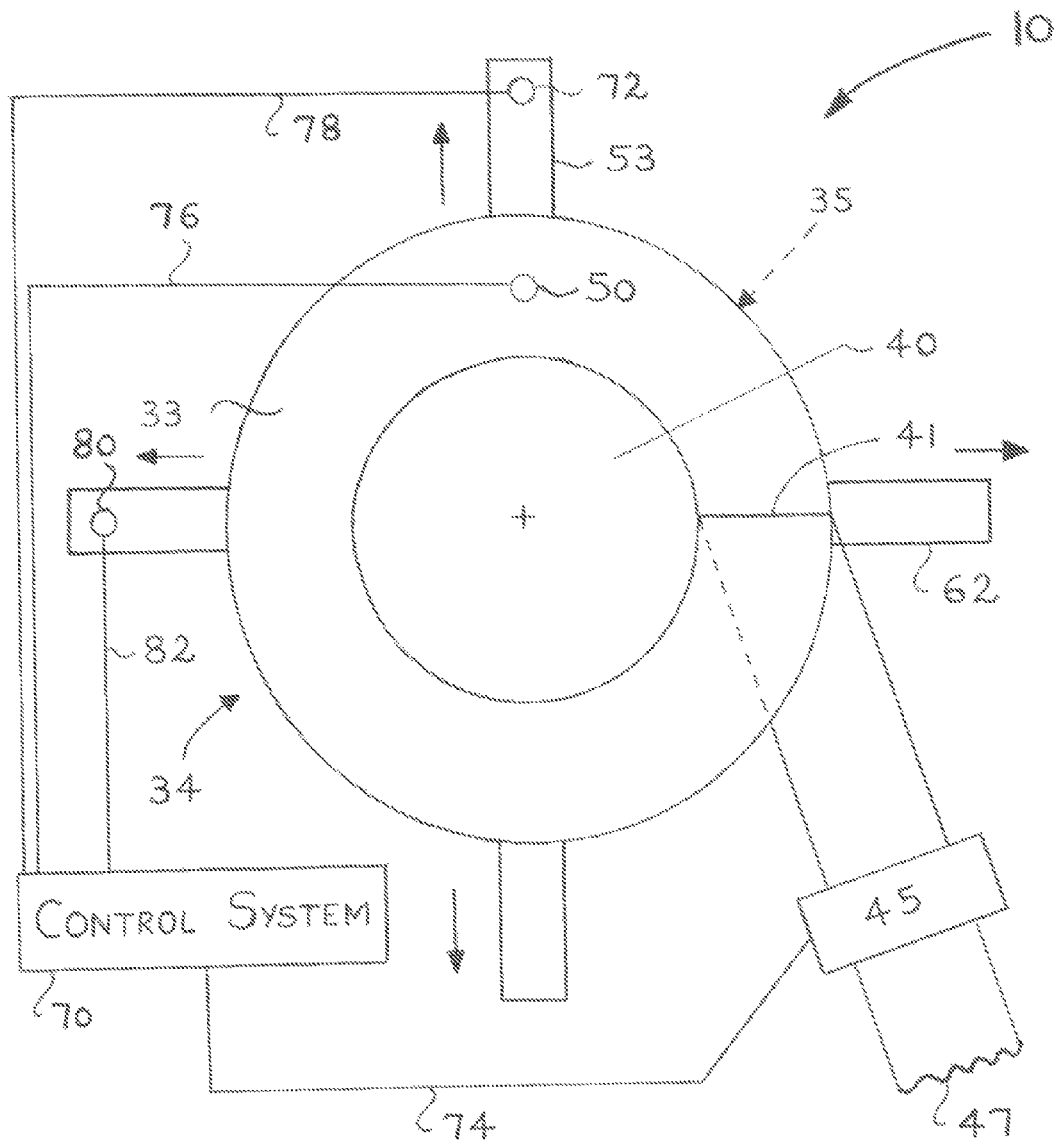
FIG. 1 is a schematic representation of a front view of a concave mirror assembly.

FIG. 1 is a schematic representation of a front view of a concave mirror assembly 10 configured to vary a spatial orientation of a concave mirror 40. More specifically, in the exemplary embodiment, the concave mirror assembly 10 includes a plurality of actuators that are configured to vary a spatial orientation of the concave mirror 40.

The concave mirror assembly 10 includes a mirror frame 34. More specifically, mirror frame 34 includes a first portion 33, and a second portion 35 that is formed as a U-shaped structural member and is axially coupled to the first portion 33. In the exemplary embodiment, the first portion 33 and the second portion 35 of the mirror frame 34 may be manufactured from a flexible material to facilitate increasing their structural conformance to compressive forces. For example, mirror frame 34 may be manufactured from, but is not limited to being manufactured from a plastic material, a leather material, a synthetic material, and/or any construction thereof. In another embodiment, mirror frame 34 is manufactured from an elastic resilient material. Alternatively, mirror frame 34 may be manufactured from any material that facilitates operation of the mirror frame 34 as described herein. In the exemplary embodiment, a first portion 33 of mirror frame 34 is circumferentially wound about itself from a first end 41 to an opposite second end 47 such that a portion of the length of the first portion 33 of the mirror frame 34 is axially spaced from the first end 41 of the mirror frame 34. More specifically, an opposite second end 47 is inserted within a buckle (not shown) that is coupled to a rear portion of the first end 41 of the mirror frame 34 to facilitate varying a circumferential length of the first portion 33 of the mirror frame 34. In an alternate embodiment, an opposite second end 47 is inserted within a groove (not shown) that is formed in a rear portion of the first end 41 of the mirror frame 34 to facilitate varying a circumferential length of the first portion 33 of the mirror frame 34.

The concave mirror assembly 10 includes a first actuator 45 that is coupled to a portion of the first portion 33 of the mirror frame 34 for varying the circumferential length of the first portion 33 of the mirror frame 34. In the exemplary embodiment, first actuator 45 may be controlled by a manual/automated control mechanism for varying the circumferential length of the first portion 33 of the mirror frame 34. More specifically, the second end 47 of the mirror frame 34 is inserted through a winding in the first actuator 45 to rotatably wind or unwind a portion of the first portion 33 of the mirror frame 34 to facilitate varying the circumferential length of the first portion 33 of the mirror frame 34.

In the exemplary embodiment, a concave mirror 40 is coupled to the mirror frame 34 to facilitate varying a radius of curvature of the concave mirror 40. More specifically, concave mirror 40 is detachably coupled within a groove (not shown) formed in the first portion 33 of the mirror frame 34 to facilitate varying a radius of curvature of the concave mirror 40 when the circumferential length of the first portion 33 of the mirror frame 34 is varied using the first actuator 45.

In the exemplary embodiment, mirror frame 34 includes a first proximity sensor 50. More specifically, in the exemplary embodiment, first proximity sensor 50 is configured to measure an axial displacement of an object from a pole of the concave mirror 40. In an exemplary embodiment, first proximity sensor 50 is integrally coupled to the first portion 33 of the mirror frame 34. In an alternate embodiment, first proximity sensor 50 is detachably coupled to the first portion 33 of the mirror frame 34.

The concave mirror assembly 10 includes a vertical slide 53 coupled to the second portion 35 of the mirror frame 34. More specifically, the second portion 35 of the mirror frame 34 is coupled to a second actuator (not shown) that is configured to translate on rails (not shown) formed in the vertical slide 53 to facilitate aligning the pole of the concave mirror 40 with a center of the object. In the exemplary embodiment, the vertical slide 53 is coupled to the horizontal slide 62. More specifically, the vertical slide 53 is coupled to a third actuator (not shown) that is configured to translate on rails (not shown) formed in the horizontal slide 62 to facilitate aligning the pole of the concave mirror with a center of the object.

In the exemplary embodiment, horizontal slide 62 includes a second proximity sensor 80. More specifically, in the exemplary embodiment, second proximity sensor 80 is configured to measure a horizontal displacement of a center of the object from the pole of the concave mirror 40. In an exemplary embodiment, second proximity sensor 80 is integrally coupled to the horizontal slide 62. In an alternate embodiment, second proximity sensor 80 is detachably coupled to the horizontal slide 62.

In the exemplary embodiment, vertical slide 53 includes a third proximity sensor 72. More specifically, in the exemplary embodiment, third proximity sensor 72 is configured to determine a vertical displacement of a center of the object from the pole of the concave mirror 40. In an exemplary embodiment, third proximity sensor 72 is integrally coupled to the vertical slide 53. In an alternate embodiment, third proximity sensor 72 is detachably coupled to the vertical slide 53.

The concave mirror assembly 10 includes a control system 70. Control system 70 is configured to be coupled to the first proximity sensor 50 through a control flow path 76. In an exemplary embodiment, control system 70 is configured to determine an axial displacement of the object from the pole of the concave mirror 40. In addition, control system 70 is configured to be coupled to the first actuator 45 through a control flow path 74. More specifically, control system 70 is configured to control an operation of the actuator 45 to facilitate varying the circumferential length of the first portion 33 of the mirror frame 34 as a function of an axial displacement of the object from the pole of the concave mirror 40. As a consequence, a radius of curvature of the concave mirror 40 that is coupled to the first portion 33 of the mirror frame 34 may be varied as a function of the axial displacement of the object from the pole of the concave mirror 40. More specifically, the radius of curvature of the concave mirror 40 may be increased or decreased by increasing or decreasing the circumferential length of the first portion 33 of the mirror frame 34 to facilitate magnifying an image of the object in the concave mirror 40 for optimum clarity.

Control system 70 is further configured to be coupled to the second proximity sensor 80 through a control flow path 82. In an exemplary embodiment, control system 70 is configured to determine a horizontal displacement of a center of the object from the pole of the concave mirror 40. Control system 70 is further configured to be coupled to the third proximity sensor 72 through a control flow path 78. In an exemplary embodiment, control system 70 is configured to determine a vertical displacement of a center of the object from the pole of the concave mirror 40.

Figure 2:
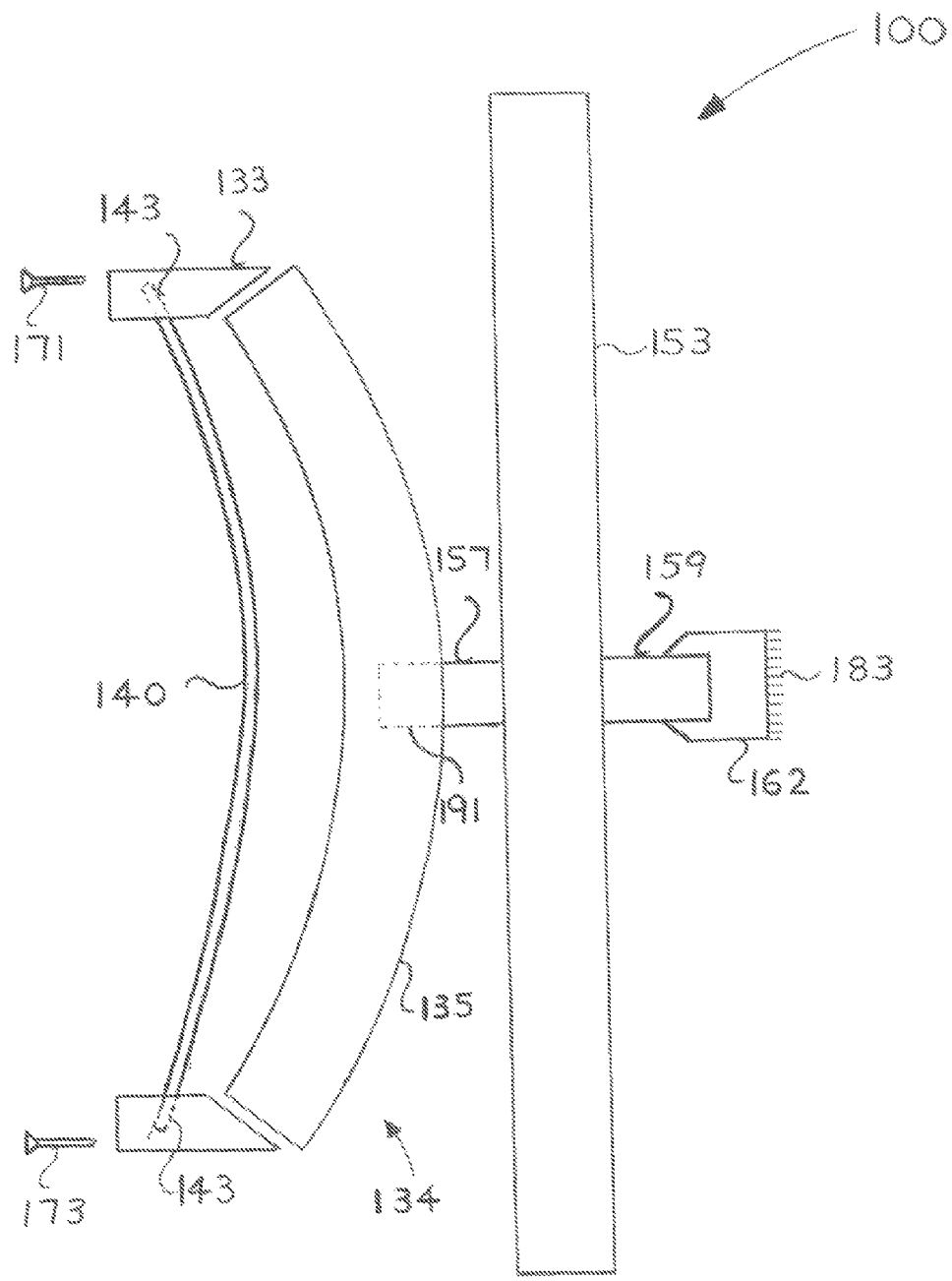
FIG. 2 is a schematic representation of a side view of the concave mirror assembly shown in FIG. 1.

FIG. 2 is a schematic representation of a side view of a concave mirror assembly 100 configured to vary a spatial orientation of a concave mirror 40.

In the exemplary embodiment, mirror frame 134 includes a first portion 133, and a second portion 135 that is formed as a U-shaped structural member and is axially coupled to the first portion 133. In an exemplary embodiment, the first portion 133 of the mirror frame 134 may be coupled to the second portion 135 of the mirror frame 134 using mechanical fasteners, 171 and 173. In an alternate exemplary embodiment, the first portion 133 of the mirror frame 134 may be detachably coupled to the second portion 135 of the mirror frame 134 using any mechanical fastening device known in the art that facilitates operation of the mirror frame 134 as described herein.

In the exemplary embodiment, a concave mirror 140 is coupled to the mirror frame 134 to facilitate varying a radius of curvature of the concave mirror 140. More specifically, concave mirror 140 is detachably coupled within a groove 143 formed in the first portion 133 of the mirror frame 134 to facilitate varying a radius of curvature of the concave mirror 140 when the circumferential length of the first portion 133 of the mirror frame 134 is varied using the first actuator 45.

The concave mirror assembly 100 includes a vertical slide 153 coupled to the second portion 135 of the mirror frame 134. More specifically, the second portion 135 of the mirror frame 134 is coupled to a second actuator 157 that is configured to translate on rails (not shown) formed in the vertical slide 153 to facilitate aligning the pole of the concave mirror 140 with a center of the object. In an exemplary embodiment, second actuator 157 is coupled within a notch 191 formed in the second portion 135 of the mirror frame 134 using a mechanical fastener (not shown) to facilitate coupling the second portion 135 of the mirror frame 134 to the vertical slide 153. In an alternate exemplary embodiment, second actuator 157 is coupled to an end of the second portion 135 of the mirror frame 134 using any mechanical fastening device known in the art that facilitates operation of the mirror frame 134 as described herein. In the exemplary embodiment, the vertical slide 153 is coupled to the horizontal slide 162. More specifically, the vertical slide 153 is coupled to a third actuator 159 that is configured to translate on rails (not shown) formed in the horizontal slide 162 to facilitate aligning the pole of the concave mirror with a center of the object. Horizontal slide 162 is configured to be coupled to a fixed support 183 to facilitate providing structural rigidity to the horizontal slide 162.

Control system 70 is further configured to be coupled to the second actuator 157 through a control flow path (not shown). In an exemplary embodiment, control system 70 is configured to control a displacement of second actuator 157 along the vertical slide 153 to facilitate aligning the pole of the concave mirror 140 with a center of the object. Control system 70 is further configured to be coupled to the third actuator 159 through a control flow path (not shown). In an exemplary embodiment, control system 70 is configured to control a displacement of third actuator 159 along the horizontal slide 162 to facilitate aligning the pole of the concave mirror 140 with a center of the object.

Figure 3:
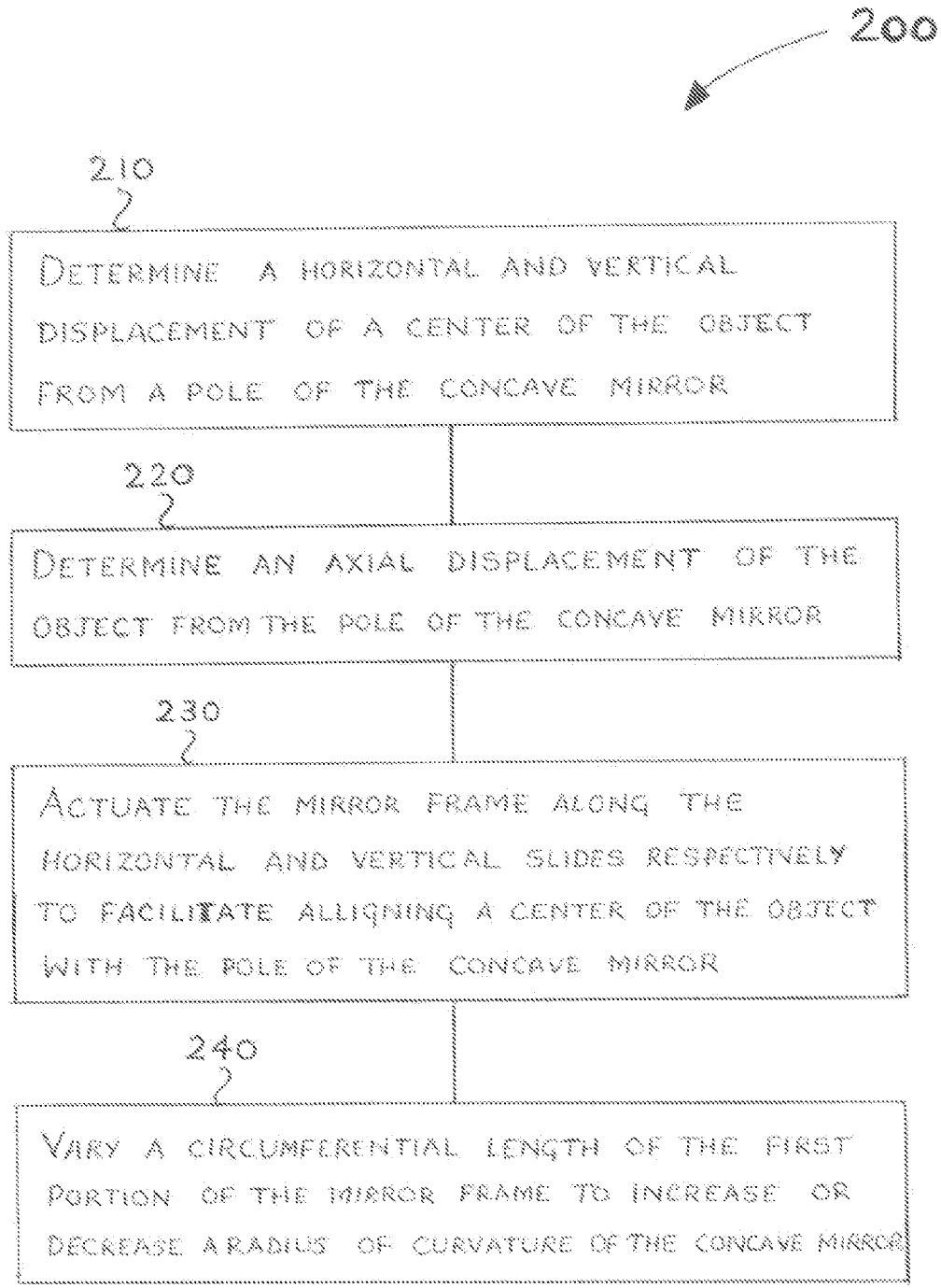
FIG. 3 is a flow diagram showing an exemplary control method for the concave mirror assembly shown in FIG. 1.

FIG. 3 is a flow diagram showing an exemplary control method 200 of operating the concave mirror assembly 10 in accordance with an embodiment of the present invention. In the exemplary embodiment, method 200 includes determining 210 horizontal and vertical displacements of a center of the object from the pole of the concave mirror 40. More specifically, second proximity sensor 80 is configured to measure a position of an axial space that exists to the left and right of the object respectively such as an axial space that exists to the left and right of a user's head portion, and transmit a corresponding electrical signal to the control system 70 via control flow path 82. Control system 70 is further configured to determine an orientation of a horizontal center of the object from the received signal and hence determine a horizontal displacement of the horizontal center of the object from a current position of the pole of the concave mirror 40. In addition, third proximity sensor 72 is configured to measure a position of an axial space that exists above and below the object such as an axial space that exists above and below a user's head portion respectively, and transmit a corresponding electrical signal to the control system 70 via control flow path 78. Control system 70 is further configured to determine an orientation of a vertical center of the object from the received signal and hence determine a vertical displacement of the vertical center of the object from a current position of the pole of the concave mirror 40.

Method 200 includes determining 220 an axial displacement of the object from the pole of the concave mirror 40. More specifically, first proximity sensor 50 is configured to measure a position of an axial space that exists between the object such as a user's head portion and the pole of the concave mirror 40, and transmit a corresponding signal to the control system 70 via control flow path 76. Control system 70 is further configured to determine an axial displacement of the object from a current position of the pole of the concave mirror 40.

In the exemplary embodiment, method 200 includes actuating 230 the mirror frame 134 along the horizontal and vertical slides to facilitate aligning a center of the object with the pole of the concave mirror 140. More specifically, control system 70 is configured to transmit a displacement signal to second actuator 157 through a control flow path (not shown) to control an axial displacement of the second actuator 157 along rails formed in the vertical slide 153 to facilitate aligning the pole of the concave mirror 140 with a center of the object. Control system 70 is further configured to transmit a displacement signal to third actuator 159 through a control flow path (not shown) to control an axial displacement of the third actuator 159 along rails formed in the horizontal slide 162 to facilitate aligning the pole of the concave mirror 140 with a center of the object.

Method 200 includes varying 240 a circumferential length of the first portion 33 of the mirror frame 34 to increase or decrease a radius of curvature of the concave mirror 40 and thereby facilitate magnifying an image of the object in the concave mirror 40 for optimum clarity. More specifically, control system 70 is configured to transmit a displacement signal to first actuator 45 through a control flow path 74 to rotatably wind or unwind a portion of the first portion 33 of the mirror frame 34, and thereby vary a circumferential length of the first portion 33 of the mirror frame 34. This technique of varying the circumferential length of the first portion 33 of the mirror frame 34 facilitates increasing or decreasing a radius of curvature of the concave mirror 40 that is coupled within the groove 143 of the first portion 33 of the mirror frame 34, thereby magnifying an image of an object in the concave mirror 40 for optimum clarity.

The above described concave mirror assembly 10 is cost effective and highly reliable. The concave mirror assembly 10 facilitates positioning a mirror frame 34 of a concave mirror assembly 10 as a function of a position of a center of an object. Moreover, varying a radius of curvature of a concave mirror 40 as a function of an axial displacement of the object from a pole of the concave mirror 40 facilitates magnifying an image of the object in the concave mirror 40 for optimum clarity. In addition, the modular nature of each sub-system of the concave mirror assembly 10 facilitates easy disassembly and replacement of individual system components as required.

Exemplary embodiments of an actuator motion control mechanism for a concave mirror are described above in detail. The systems are not limited to the specific embodiments described herein, but rather components of each system may be utilized separately and independently from other components described herein.

While the invention has been described in terms of various specific embodiments, those skilled in the art will recognize that the invention can be practiced with modifications within the spirit and scope of the claims.

What is claimed is:

1. A method for varying a radius of curvature of a concave mirror to magnify an image of an object in the concave mirror for optimum clarity, said method comprising:
    coupling a first proximity sensor to a first portion of a mirror frame;
    coupling the concave mirror to the first portion of the mirror frame;
    measuring an axial displacement of the object from a pole of the concave mirror using the first proximity sensor; and
    varying the radius of curvature of the concave mirror as a function of the axial displacement of the object from the pole of the concave mirror to magnify the image of the object in the concave mirror for optimum clarity.

2. A method in accordance with claim 1 further comprising:
    coupling a second portion of the mirror frame to the first portion of the mirror frame;
    coupling the second portion of the mirror frame to a vertical slide; and
    coupling the vertical slide to a horizontal slide.

3. A method in accordance with claim 2 further comprising coupling the horizontal slide to a fixed support.

4. A method in accordance with claim 2 further comprising:
coupling a second proximity sensor to the horizontal slide; and
coupling a third proximity sensor to the vertical slide.

5. A method in accordance with claim 4 further comprising:
measuring a horizontal displacement of a center of the object from the pole of the concave mirror using the second proximity sensor; and
measuring a vertical displacement of a center of the object from the pole of the concave mirror using the third proximity sensor.

6. A method in accordance with claim 2 further comprising:
coupling a first actuator to an end of the first portion of the mirror frame to vary a circumferential length of the first portion of the mirror frame;
coupling a second actuator between the second portion of the mirror frame and rails formed in the vertical slide to actuate the second portion of the mirror frame along the vertical slide; and
coupling a third actuator between the vertical slide and rails formed in the horizontal slide to actuate the vertical slide along the horizontal slide.

7. A method in accordance with claim 6 further comprising:
actuating the second portion of the mirror frame along the vertical slide using the second actuator to facilitate aligning a center of the object with the pole of the concave mirror; and
actuating the vertical slide along the horizontal slide using the third actuator to facilitate aligning a center of the object with the pole of the concave mirror.

8. A concave frame and mirror assembly for varying a radius of curvature of a concave mirror to magnify an image of an object in said concave mirror for optimum clarity, said concave frame and mirror assembly comprising:
a mirror frame comprising a first portion and a second portion, the second portion coupled to the first portion of said mirror frame;
an actuator coupled to an end of the first portion of said mirror frame, said actuator configured to vary a circumferential length of the first portion of said mirror frame;
a concave mirror coupled to the first portion of said mirror frame, the first portion of said mirror frame configured to vary a radius of curvature of said concave mirror to magnify an image of said object in said concave mirror for optimum clarity; and
a first proximity sensor coupled to the first portion of said mirror frame, said first proximity sensor configured to measure an axial displacement of said object from a pole of said concave mirror.

9. A concave frame and mirror assembly in accordance with claim 8 wherein the first portion and the second portion of said mirror frame are formed from a substantially resilient material.

10. A concave frame and mirror assembly in accordance with claim 8 wherein said concave mirror is formed from a substantially resilient material.

11. A concave frame and mirror assembly in accordance with claim 8 wherein said concave mirror is coupled to the first portion of said mirror frame by coupling said concave mirror within a groove formed in the first portion of said mirror frame.

12. A concave frame and mirror assembly in accordance with claim 8 wherein the second portion of said mirror frame is formed as a U-shaped structural member.

13. A concave mirror assembly for varying a radius of curvature of a concave mirror, said concave mirror assembly comprising:
a mirror frame comprising a first portion and a second portion coupled to the first portion, the second portion of said mirror frame coupled to a vertical slide;
a horizontal slide coupled to said vertical slide;
a fixed support coupled to said horizontal slide;
a first actuator coupled to an end of the first portion of said mirror frame, said first actuator configured to vary a circumferential length of the first portion of said mirror frame; and
a concave mirror coupled to the first portion of said mirror frame, the first portion of said mirror frame configured to vary a radius of curvature of said concave mirror to magnify an image of an object in said concave mirror for optimum clarity.

14. A concave mirror assembly in accordance with claim 13 further comprising:
a first proximity sensor coupled to the first portion of said mirror frame, said first proximity sensor configured to measure an axial displacement of said object from a pole of said concave mirror;
a second proximity sensor coupled to said horizontal slide, said second proximity sensor configured to measure a horizontal displacement of a center of said object from the pole of said concave mirror; and
a third proximity sensor coupled to said vertical slide, said third proximity sensor configured to measure a vertical displacement of a center of said object from the pole of said concave mirror.

15. A concave mirror assembly in accordance with claim 13 further comprising:
a second actuator coupled between the second portion of said mirror frame and rails formed in said vertical slide, said second actuator configured to actuate the second portion of said mirror frame along said vertical slide; and
a third actuator coupled between said vertical slide and rails formed in said horizontal slide, said third actuator configured to actuate said vertical slide along said horizontal slide.

16. A concave mirror assembly in accordance with claim 13 wherein the first portion and the second portion of said mirror frame are formed from a substantially resilient material.

17. A concave mirror assembly in accordance with claim 13 wherein said concave mirror is formed from a substantially resilient material.

18. A concave mirror assembly in accordance with claim 13 wherein said concave mirror is coupled to the first portion of said mirror frame by coupling said concave mirror within a groove formed in the first portion of said mirror frame.

* * * * *